United States Patent
Jussel et al.

(10) Patent No.: US 10,955,192 B2
(45) Date of Patent: Mar. 23, 2021

(54) DENTAL FURNACE AS WELL AS METHOD FOR OPERATING A DENTAL FURNACE

(71) Applicant: Ivoclar Vivadent AG, Schaan (LI)

(72) Inventors: Rudolf Jussel, Feldkirch (AT); Manuel Schlegel, Mels (CH)

(73) Assignee: Ivoclar Vivadent AG, Schaan (LI)

( * ) Notice: Subject to any disclaimer, the term of this patent is extended or adjusted under 35 U.S.C. 154(b) by 170 days.

(21) Appl. No.: 16/128,672

(22) Filed: Sep. 12, 2018

(65) Prior Publication Data
US 2019/0086150 A1    Mar. 21, 2019

(30) Foreign Application Priority Data

Sep. 18, 2017 (EP) .................................... 17191620

(51) Int. Cl.
*F27B 17/02*    (2006.01)
*A61C 13/20*    (2006.01)
*F27D 21/00*    (2006.01)

(52) U.S. Cl.
CPC ............ *F27B 17/025* (2013.01); *A61C 13/20* (2013.01); *F27D 2021/0007* (2013.01)

(58) Field of Classification Search
CPC ............ F27B 17/025; F27B 2014/0837; F27B 2005/062; A61C 13/20; F27D 2021/007
USPC ........................................................ 432/19
See application file for complete search history.

(56) References Cited

U.S. PATENT DOCUMENTS

| | | | |
|---|---|---|---|
| 4,324,545 A * | 4/1982 | Hubbert | F23G 7/066 |
| | | | 432/223 |
| 4,609,031 A * | 9/1986 | Sasaki | B22D 31/002 |
| | | | 164/270.1 |
| 9,951,993 B2 | 4/2018 | Jussel et al. | |
| 2013/0029279 A1* | 1/2013 | Jussel | F27B 17/025 |
| | | | 432/23 |
| 2017/0073786 A1* | 3/2017 | Katsumata | F27B 5/14 |

FOREIGN PATENT DOCUMENTS

| | | |
|---|---|---|
| DE | 1160777 B | 1/1964 |
| DE | 4303458 C1 | 1/1994 |
| DE | 10208801 C1 | 6/2003 |

(Continued)

*Primary Examiner* — Steven B McAllister
*Assistant Examiner* — Charles R Brawner
(74) *Attorney, Agent, or Firm* — Ann M. Knab; Thad McMurray

(57) ABSTRACT

A dental furnace having closed or closeable firing chamber (12), which is surrounded by thermal insulation (20) and which comprises at least one inlet terminal (22) and at least one outlet terminal (24). Via said two terminals, a gas, especially air, may be passed through the firing chamber (12) and/or may be discharged from the firing chamber (12), wherein a vacuum source (44) is provided, which is in direct or indirect communication with the outlet terminal (24) and via which the outlet terminal (24) may be set under vacuum pressure. At the outlet terminal (24), an especially T-shaped or Y-shaped connector (26) is attached. The connector (26) comprises two entrance ports (32, 24) and an exit (40), wherein the exit (40) is in communication with the vacuum source (44) and a first entrance port is in communication with the firing chamber (12), and especially is flange-mounted at the outlet terminal (24) thereof, and a second entrance port (34) is in communication with ambient air.

17 Claims, 5 Drawing Sheets

(56) References Cited

FOREIGN PATENT DOCUMENTS

| JP | 2001116482 A | * | 4/2001 | ................ F28F 1/36 |
| JP | 2011073907 A | | 4/2011 | |
| WO | WO-2013030890 A1 | * | 3/2013 | .............. B60L 50/64 |

* cited by examiner

DENTAL FURNACE AS WELL AS METHOD FOR OPERATING A DENTAL FURNACE

CROSS-REFERENCE TO RELATED APPLICATIONS

This application claims priority to EP 17191620.8, filed Sep. 18, 2018, the disclosure of which is incorporated herein by reference in its entirety.

TECHNICAL FIELD

The invention relates to a dental furnace as well as a method for operating a dental furnace.

BACKGROUND

Dental furnaces, wherein the firing chamber may be placed under vacuum via a vacuum source, are known.

One example is the dental furnace known from DE 1 160 777 A1. With this solution, the firing chamber is allowed to be placed under vacuum, but simultaneously, a lifting device is allowed to be operated by the same vacuum pump.

Consequently, such solutions have been further pursued, such as, for example in DE 102 08 801 C1.

To meet the different requirements in view of vacuum pressure control, it has already been suggested to work with controllable vacuum pressure pumps. However, they are comparably expensive, and also operate with a complex controller, for example by using a PID-control.

SUMMARY OF THE INVENTION

Meanwhile, the object of the invention is to provide a dental furnace as well as an appropriate method for operating the dental furnace, which, at low cost, allow improved adaption of the pressure state and vacuum pressure states during the heat treatment process.

According to the invention, it is especially beneficial, that, with a simple vacuum pressure pump, optimal ventilation measures that meet the requirements of the heat treatment process may be taken. At the outlet terminal of the dental furnace a T-shaped or Y-shaped connector is provided. An entrance port of the connector piece is connected to the outlet terminal of the dental furnace. The exit of the connector piece is connected to the vacuum source, i.e. for example an appropriate suction pump. It is to be understood that instead of the suction pump a vacuum pressure reservoir may also be employed.

The other inlet terminal of the connector piece is connected to ambient air, and preferably is controllably provided with a flow resistor. The flow resistor may be formed as a valve that is being opened and closed depending on the requirements of the heat treatment process.

The dental furnace furthermore comprises an inlet terminal for the firing chamber, which preferably is oppositely arranged at the outlet terminal thereof. Moreover, the inlet terminal is connected to a line, which is referred to as a second air line, the second line having a flow resistor, such as for example a filter and/or a valve.

The preferred procedure during the heat treatment process, as a first step, includes evacuation of the firing chamber in preparation for the heat treatment process. For this, the valves in the first air line and the second air line are closed, and the suction pump works to provide the vacuum pressure, until a predetermined vacuum pressure or the final vacuum is accomplished.

The heat treatment process will be started when heating the firing chamber. At a predetermined temperature level, the valve now will be opened at the inlet terminal of the firing chamber, while the suction pump is in operation. Opening and closing may be done for short periods, for example, 1 second. The fresh air introduced into the firing chamber causes oxygen to be supplied to the dental restoration without excessive cool down.

The cool down process may also be operated by intermittently opening the inlet terminal valve or by completely opening the inlet terminal valve. The suction pump may thereby pass the maximum volume flow through the firing chamber.

The discharged air may be cooled, for example via a heat exchanger.

As required, rapidly flushing the firing chamber with fresh air by opening both valves is also possible. This may result in process acceleration and/or quality improvement of the dental restoration part.

According to the invention, it is especially beneficial for the cool down time to be able to be strongly reduced, as required, as thermal energy may be withdrawn from the firing chamber by the fresh air flushing the firing chamber during the cool down process. When oppositely arranged, in the inlet terminal and exit terminal, heat will be withdrawn exactly at that location, where relevant for cool down, i.e. in the firing chamber.

In this way there is substantial progress in comparison to a free cool down, where mainly the surrounding of the firing chamber will be involved.

According to the invention, a heat exchanger may be provided, conveying heat from the suction line between the exit of the connector piece and the vacuum source to the second air line at the inlet terminal of the firing chamber.

Such a heat recovery is especially beneficial during heating up or in a period of time during the heat treatment process, where the temperature is to be held essentially constant. The firing chamber may subsequently be vented with warm fresh air without causing abrupt cool down and risks associated thereto, during heat treatment.

In this way, the suction line starting from the heat exchanger will simultaneously be cooled, so that incorporation of a cooling trap for saving the pump is not required. It should further be mentioned that during the heat treatment process aggressive steam may eventually occur, against which the suction line, especially at hot temperatures, is otherwise required to be protected.

According to the invention, it is especially beneficial for the outlet terminal of the furnace to be located on top and the inlet terminal to be located at the bottom. As necessary, cooling of the firing chamber is allowed to be optimized.

In an advantageous embodiment it is preferable that the connector be formed of a highly thermal conductive metal having comparably large surface area. It thereby becomes possible to dissipate heat already at that location, after the connector is surrounded by ambient air. The connector preferably is designed such that gases having temperatures up to 1200, 1400 or even 1600 degree Celsius will not damage the metal connector, with the capacity being predetermined by several liters/minute.

Due to cooling by the heat exchange at the connector, the exit air will significantly be cooled down, so that on the outlet side, for example, a maximum temperature of only 500 degree is present.

If the temperature for the materials being used for the suction line becomes too high, there is also the possibility for the valve in the first air line to be additionally opened when withdrawing hot air, so that hot and cold air will be mixed in the connector and the temperature is allowed to be lowered, for example to 200 degree.

It is to be understood that the valves in the first air line and the second air line are formed as on/off valves. They preferably are closed while being in the current-free state. It is also possible, if required, for the first air line and/or the valve in the second air line to be formed as a controllable valve.

If the valve in the first air line, which may also be referred to as a bypass valve, becomes partially opened, flow limitation arises in the first air line. In this way, the volume flow through the firing chamber is allowed to be set to any desired value, if required, so that part of the air withdrawn through the suction line will be supplied through the first air line and another part will be supplied through the second air line and the firing chamber.

In this way, it is possible to reduce vacuum pressure arising in the firing chamber by using a simple suction pump, if this is desired.

In another advantageous embodiment, it may provided to guide the first air line in such a way that the fresh air supplied there is cooling other components, including, but not limited to, for example the power electronics of the dental furnace, which typically are disposed in the oven bottom part. It is also possible for the air to be passed through the first air line above the thermal insulation of the furnace cover, to preventively further cool most of the metallic housing wall.

If the suction pump is arranged directly adjacent to the furnace and accordingly, a short suction line is present, it may be of advantage, to use a cooling trap in the suction line shortly upstream of or just before the suction pump.

It is preferred for the connector to be directly attached to the dental furnace, i.e. for example, to be mounted onto the furnace cover. It may be reasonable in an individual case, for the connector to be mounted spaced apart from the dental furnace, wherein it is to be understood that the consequently short high temperature line between the connector and the dental furnace is required to be especially temperature resistant.

Moreover, it is also possible to use more than one terminal for suction removal and, for example, to arrange one connector at the top right on the furnace cover and one connector at the top left on the furnace cover, or opposite to each other at the top right and the top left or vice versa. The inlet terminal then is significantly adjacent to the connector pieces, allowing the inlet terminal and the connector pieces to be arranged roughly in a triangle, so that fresh air entering through the inlet terminal towards the connector pieces will pass the firing chamber, respectively.

The suction pump, if required, may also be operated in a timed manner, so that in total a reduced volume flow will be provided. Due to a comparably long suction line, a vacuum pressure buffer exists, reducing the switching effect of the timing.

As typical low cost suction pumps are reasonably loud, it is also considered, that the suction pump is to be operated above the space, where the dental furnace is arranged. The suction line may be 5, 10 or even 20 m in length, so that due to such a long suction, a cool trap may also be omitted.

Meanwhile, according to the invention it is possible, depending on the presettings of the heat treatment process, to provide the maximum vacuum pressure or any lower vacuum pressure at different temperature levels. With the heat exchanger, heat withdrawal is allowed to be minimized. Alternatively, rapid cool down may be produced, wherein it is also possible, to bypass the heat exchanger at an input side, so that its effect may be turned down, if required.

It is to be understood that the flow cross-section of the lines, from a fluidic point of view, may be adapted to the requirements. If, for example a suction line and a first and second air line is operated, it is preferred that the flow cross-section of the suction line be twice as large as the air lines. Of course, this analogously is true for the connector, which in its most simple version, has two bores as inlets and a bore as an exit, that meet each other. Meanwhile, the connector may be formed in a Y-shaped, T-shaped or star-shaped manner. It may also be provided with a protection against contact, for example a cover, leaving several centimeters of air.

The connector may also be provided with a comparably long connecting piece for the first air line. The connecting piece may be formed as cooling ribs, so that the overall metal connector will be cooled by the supply of the cool air through the first air line.

The heat treatment process may be a sintering process or a heating/baking process.

BRIEF DESCRIPTION OF THE DRAWINGS

These and other embodiments of the invention will now be described in more detail with reference to the attached drawing, which show embodiments of the invention.

DETAILED DESCRIPTION

Figure 1:
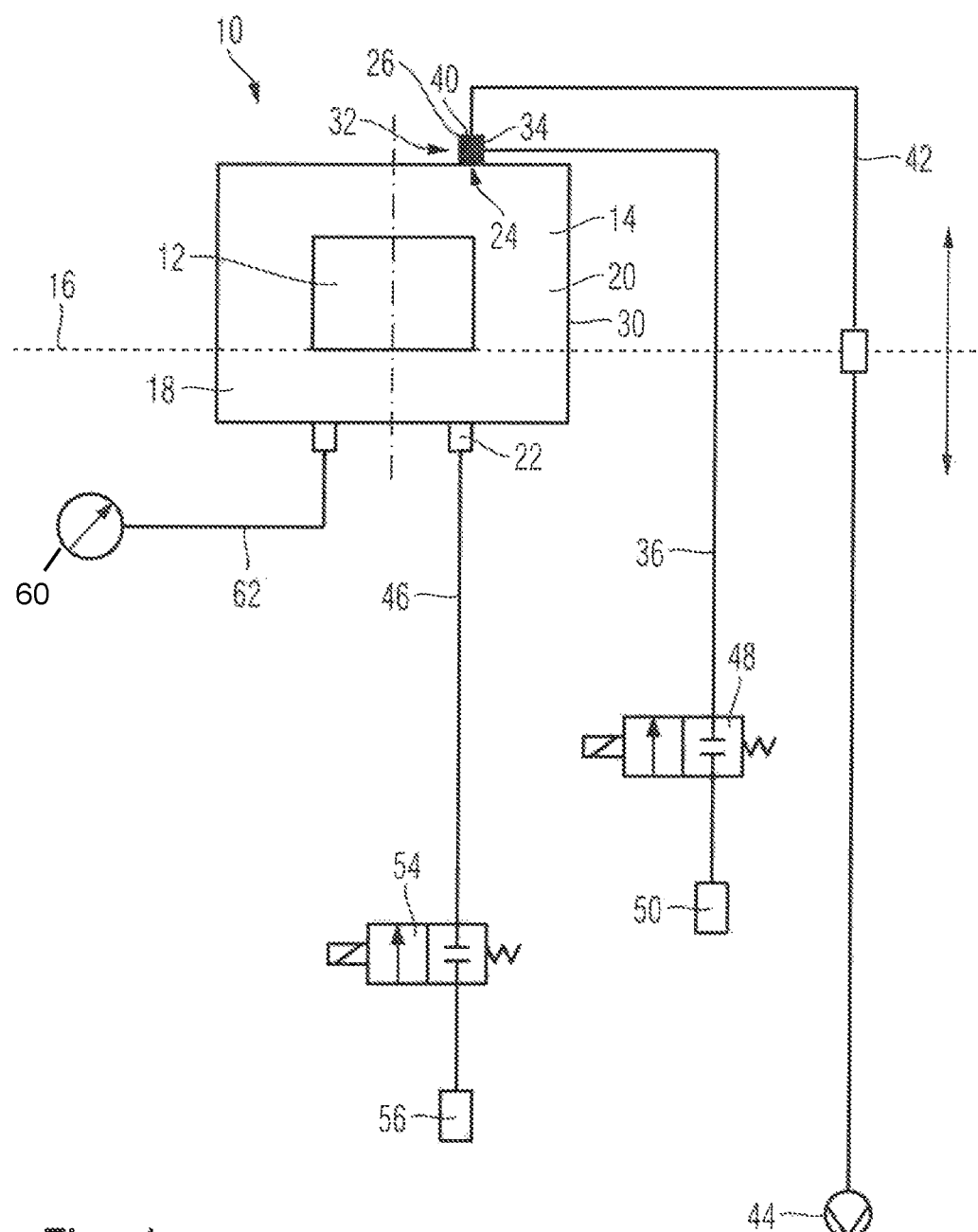
FIG. 1 shows a schematic assembly of different lines and circuit elements of a dental furnace according to the invention.

The dental furnace 10 schematically represented in the FIG. 1 comprises a firing chamber or a firing cavity 12, which is formed in a furnace head 14. The furnace head 14 closes at a separation plane 16 opposite a furnace bottom part 18.

In a manner known per se, the furnace head 14 comprises heating elements, annularly extending around the essentially cylindrical firing chamber 12. Both the furnace head 14 and the furnace bottom part 18 are provided with thermal insulating material 20, which for example may be formed as a fireclay, and is open-pored, so that it allows passing there through.

According to the invention, the dental furnace 10 is provided with an inlet terminal 22 for supplying ambient air, which may also be referred to as fresh air, as well as an outlet terminal 24, at which a connector 26 is attached.

The connector 26 is directly flange-mounted to the housing wall 30 of the furnace head 14. It comprises an entrance port 32, which is in flow communication with the thermal open pore insulating material 20. Moreover, it comprises a second entrance port 34, which is in communication with ambient air via a first air line 36.

Furthermore, the connector 26 comprises an exit 40, which is in flow communication with a suction line 42.

In the represented working example both the first air line 36 and the suction line 42 extend in the region of the furnace head 14 and from there extends downwards, i.e. towards the region of the furnace bottom part 18, and eventually extends laterally apart therefrom.

The suction line 42 extends towards a vacuum source 44, which preferably is formed as a suction pump 44, and the exhaust air thereof is preferably passed below the space, where the dental furnace is located.

The inlet terminal 22 is in communication with a second air line 46.

The first air line 36 is provided with a bypass valve 48, which is in communication with a filter and/or sound absorber 50 with the ambient air.

Similarly, the second air line 46 is provided with a second valve 54, which is in communication with a second filter and/or sound absorber 56 with the ambient air.

In the working example represented, a vacuum pressure sensor 60 is provided, which, via a branch line 62, is in communication with the interior of the dental furnace 10. In this way, the existing vacuum pressure in the firing chamber 12 is allowed to be acquired and is used for controlling both valves 48 and 54 and the suction pump 44.

For performing a heat treatment process, in the working example represented herein, the bypass valve 48 and the second valve 54 are initially closed and the suction pump 44 is turned on.

Alternatively, the second valve 54 for a short time may be maintained in the opened position, to safely remove any residual gases of the last heat treatment process.

Following this, the heat treatment process is started, in which the heater not represented herein for the firing chamber 12 is turned on. This is done under vacuum pressure, and the vacuum pressure will be maintained following operation of the suction pump 44 during that time, so that any small leakages will not reduce the vacuum pressure.

If the temperature for the next section of the heat treatment process is to be lowered, the suction pump 44 will be turned on and the valve 54 will be opened. In this way, the firing chamber 12 is flushed with fresh air and it is possible to provide rapid cool down, if required. The suction pump 44 may also be turned on to be timed, if cool down is to be less rapid.

In any case, this method is more advantageous than to open the firing chamber at the separation line 16, after otherwise cool air has always been supplied abruptly.

In a modified method, the bypass valve 48 is also opened, at least partially, during operation of the suction pump 44. In this way, the level of the vacuum pressures, which is measured by the vacuum pressure sensor 60, is allowed to be controlled.

Figure 4:
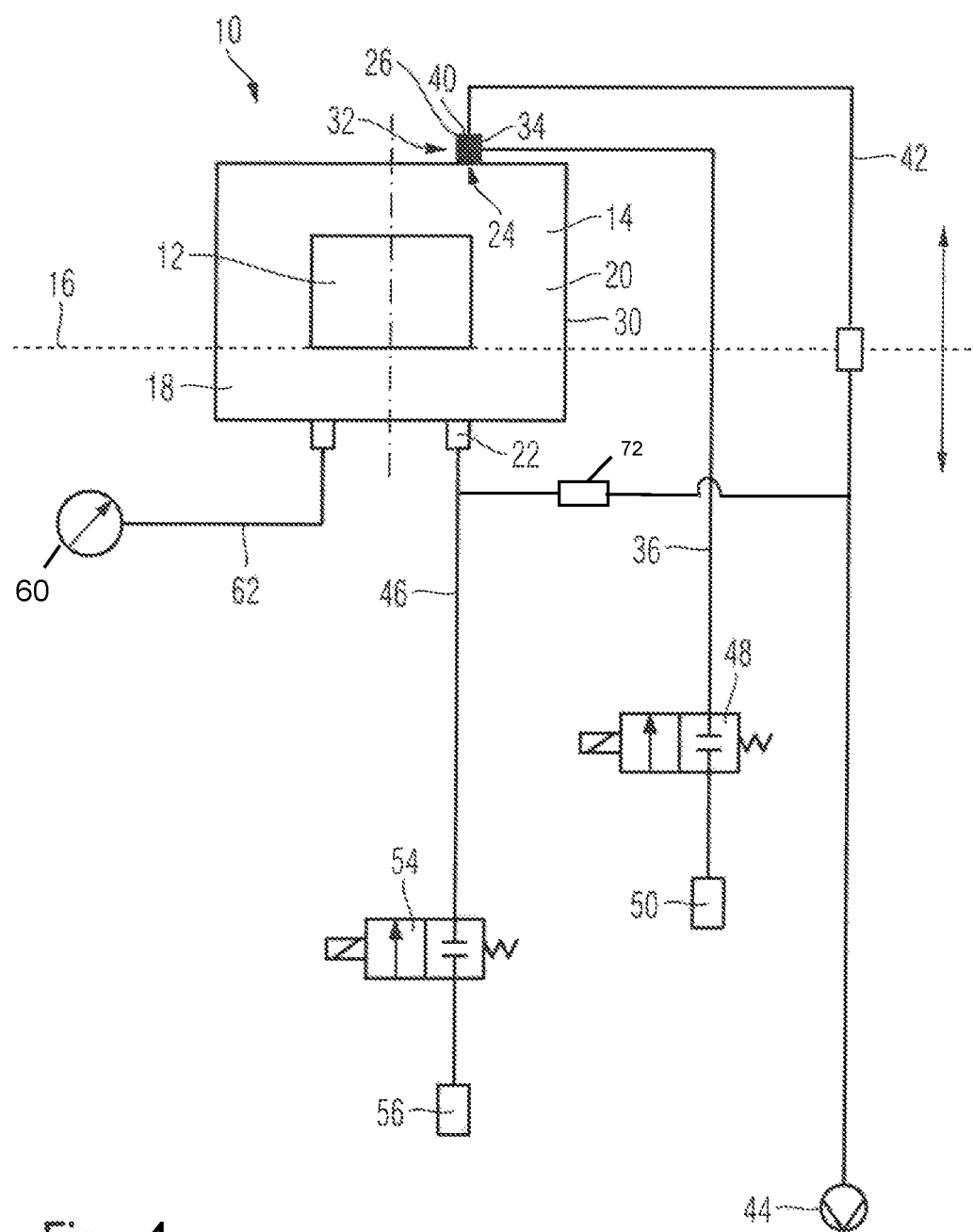
FIG. 4 shows a schematic assembly of different lines and circuit elements of a dental furnace according to the invention.

In another modified embodiment, shown in FIG. 4, the suction line 42 and the second air line 46 are positioned to be close to each other and to provide a heat exchanger 72 there between. In this way, hot furnace air exiting the exit 44 is allowed to be thermally recycled and to be fed into the air line 46, which is especially favorable during heating up.

The heat exchanger, if required, may also be provided with an additional bypass line at the entrance side and/or at the exit side, which in turn may comprise a valve. By the valve, the respective side of the heat exchanger will quasi be closed, so that the heat exchange effect will be omitted, as it is especially beneficially during cool down and supply of cold fresh air.

The dental furnace according to the invention may also be formed as a sintering furnace. According to the invention, the exhaust air generated therein may excellently be dissipated with the suction pump 44 according to the invention and the associated valves.

Figure 2:
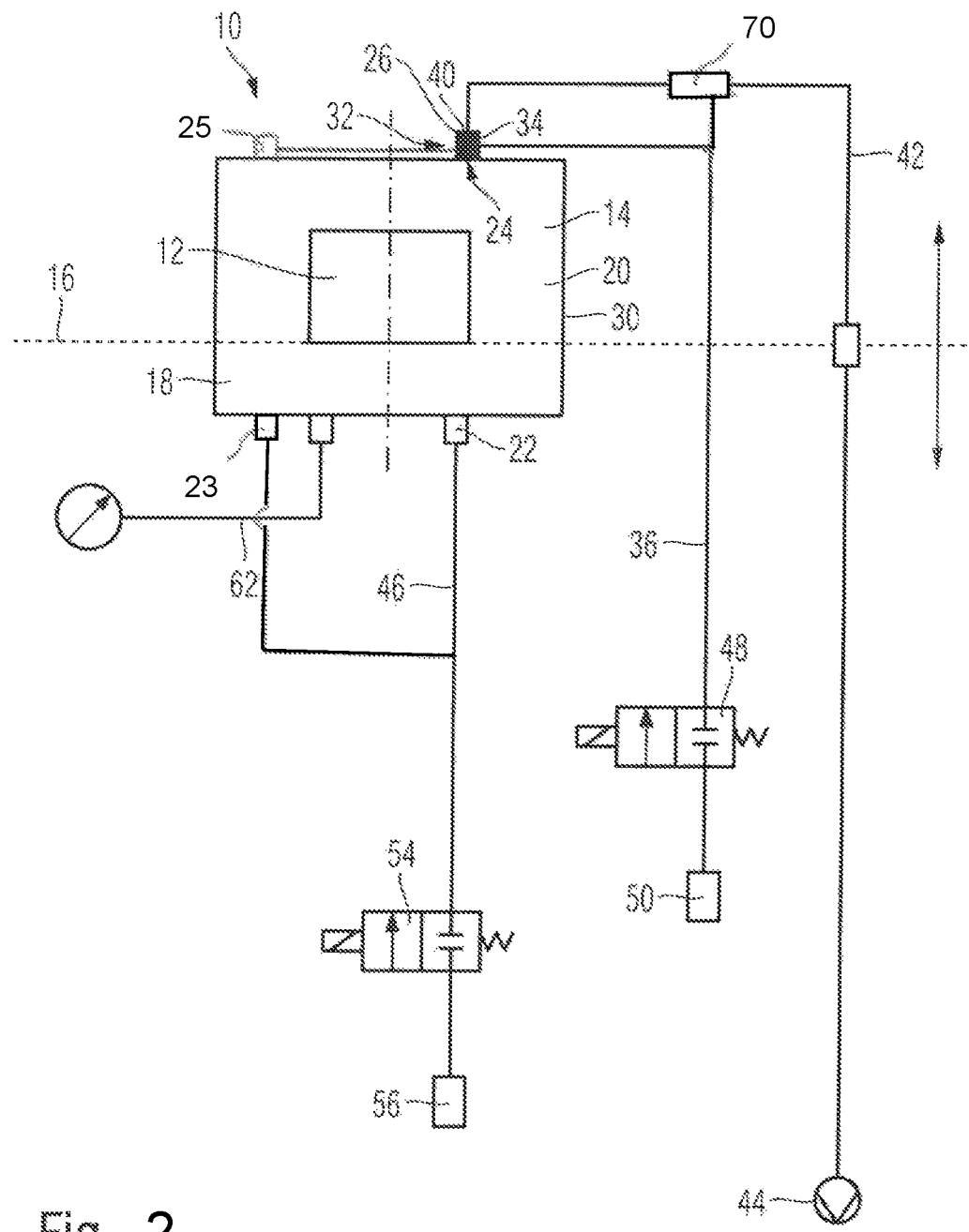
FIG. 2 shows a schematic assembly of different lines and circuit elements of a dental furnace according to the invention.

According to FIG. 2, two inlet terminals 22, 23 for supplying fresh air to the firing chamber 12 are provided. They are arranged spaced apart from each other and are located opposite of two outlet terminals 24, 25 which are joined at the connector 26.

In addition, the suction line 42 comprises a heat exchanger 70 which is also connected to the air line 36 of the entrance port 34 of the dental furnace 10.

Figure 3B:
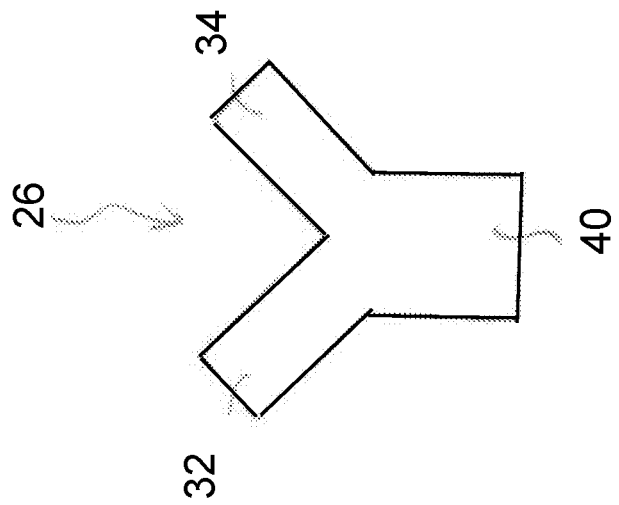
FIG. 3b shows schematically a longitudinal section of a Y-shaped connector according to the invention.
Figure 3A:
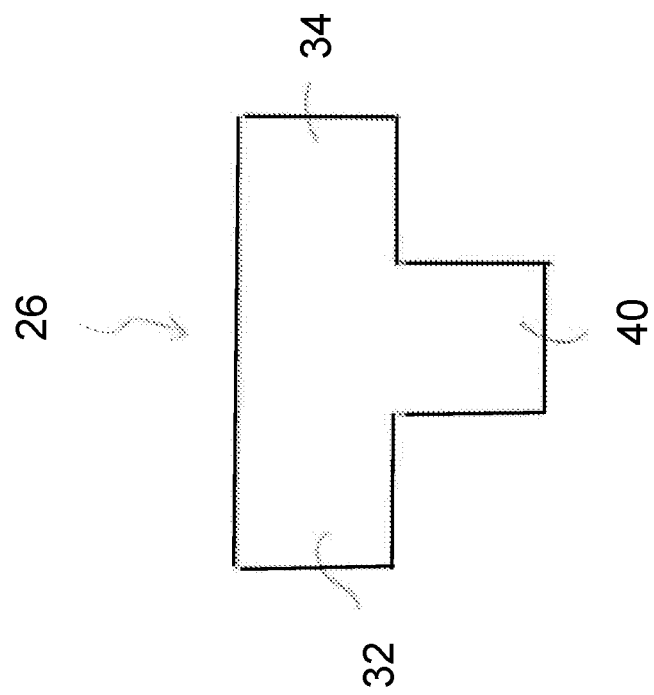
FIG. 3a shows schematically a longitudinal section of a T-shaped connector according to the invention.

According to FIG. 3a and FIG. 3b, a T-shaped or Y-shaped connector 26 is provided.

It comprises an entrance port 32 which is in flow communication with the thermal open pore insulating material 20. Moreover, the connector 26 comprises a second entrance port 34 which is in communication with ambient air via a first air line 36.

Furthermore, the connector 26 comprises an exit 40 which is in flow communication with a suction line 42.

Figure 5:
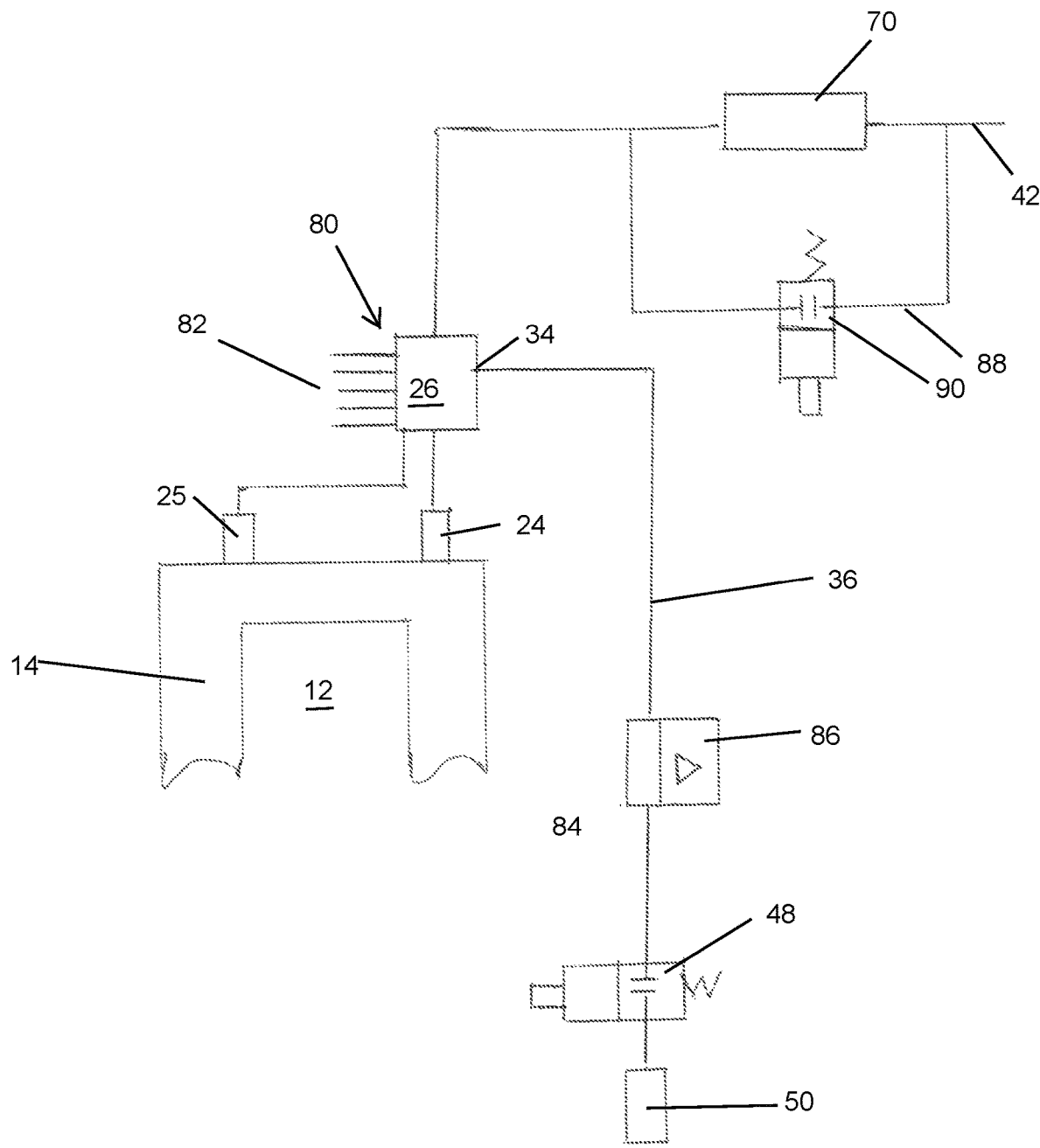
FIG. 5 shows a schematic assembly of different lines and circuit elements of a dental furnace according to the invention.

According to FIG. 5, the heat exchanger 70 is provided with a bypass line 88, which is provided with a switching valve 90 between the bypass line 88 and the heat exchanger 70. The connector 26 has an enlarged surface 80 having cooling ribs 82 A fresh air line 36 supplies fresh air to the second entrance port 34 of the connector 26 and is connected to an external heat source 84. The fresh air supplies cooling air to the external heat source 84. The external heat sources 84 of the dental furnace 10 comprise power electronics 86.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A dental furnace comprising a closed or closable firing chamber, which is surrounded by thermal insulation,
    at least one inlet terminal and at least one outlet terminal, through both of which a gas is passed through the firing chamber and/or us evacuated through the firing chamber,
    a vacuum source in direct or indirect communication with the at least one outlet terminal and by which the at least one outlet terminal is depressurized,
    wherein at the at least one outlet terminal a T-shaped or Y-shaped connecter is directly attached, wherein the connector comprises two entrance ports and one exit wherein the exit is in communication which the vacuum source, and a first entrance port is in communication with the firing chamber and a second entrance port is in communication with the ambient air.

2. The dental furnace according to claim 1,
    wherein the gas comprises air and the first entrance port is flange-mounted to the at least one outlet terminal.

3. The dental furnace according to claim 1,
    wherein the second entrance port of the connector is connected to a first air line having a flow resistor.

4. The dental furnace according to claim 3,
    wherein the flow resistor comprises a valve.

5. The dental furnace according to claim 1,
wherein the at least one inlet terminal and the at least one outlet terminal are arranged opposite to each other on the firing chamber of the dental furnace, such that at least one part of the firing chamber extends there between.

6. The dental furnace according to claim 3,
wherein the at least one inlet terminal is connected to a second air line which comprises a valve and/or a filter.

7. The dental furnace according to claim 3,
wherein a suction line extends between the connector and the vacuum source, enabling heat exchange between the ambient air of the first air line and the aspirated air passing through the suction line due to the material used for the suction line.

8. The dental furnace according to claim 7,
wherein the suction line comprises a heat exchanger, which is also connected to the first air line of the entrance port of the dental furnace.

9. The dental furnace according to claim 8,
wherein the heat exchanger is provided with a bypass line located on the suction line, which bypass line is provided with a switching valve.

10. The dental furnace according to claim 1,
wherein the connector is fabricated of a thermally conductive material, and
wherein the connector near the second entrance port is provided with a connecting piece predetermined length.

11. The dental furnace according to claim 10,
wherein the thermally conductive material comprises metal, and
wherein the predetermined length equals 10 cm in length.

12. The dental furnace according to claim 10,
wherein the connector comprises cooling ribs.

13. The dental furnace according to claim 1,
wherein the fresh air line supplying fresh air to the second entrance port of the connector, is connected to external heat sources of the dental furnace and
wherein the fresh air supplied cooling air to the external heat sources for cooling and evacuation of hot air.

14. The dental furnace according to claim 13,
wherein the external heat sources of the dental furnace comprise power electronics.

15. The dental furnace according to claim 1,
wherein at least two inlet terminals for supplying fresh air to the firing chamber are provided, which are arranged spaced apart from each other and are located opposite of the at least one outlet terminal.

16. A method for operating a dental furnace,
the method comprising
providing the dental furnace
wherein the dental furnace comprises
a closed or closable firing chamber, which is surrounded by a thermal insulation,
at least one inlet terminal and at least one outlet terminal, through both of which a gas is passed through the firing chamber and/or is discharged through the firing chamber,
a vacuum source in direct or indirect communication with the outlet terminal and by which the outlet terminal is depressurized,
wherein at the at least one outlet terminal a T-shaped or Y-shaped connector is directly attached, wherein the connector comprises two entrance ports, and a first entrance is in communication with the firing chamber and a second entrance port is in communication with ambient air,
evacuating gas from the firing chamber using vacuum pressure via the at least one outlet terminal prior to starting the heat treatment process,
performing the heat treatment process in an evacuated state, and
supplying the firing chamber with ambient air at a predetermined temperature via an inlet terminal.

17. The method according to claim 16, comprising
starting from a predetermined temperature during cool down or at any other point of time during the heat treatment process, continuously aspirating ambient air through the firing chamber by intervention of the vacuum source.

* * * * *